A. LAFITTE.
DISTRIBUTION GEAR, SUCH AS VALVE MECHANISM.
APPLICATION FILED MAY 17, 1912.
1,138,960. Patented May 11, 1915.
2 SHEETS—SHEET 1.
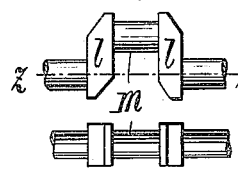
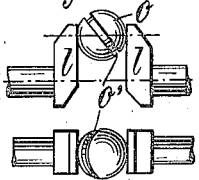
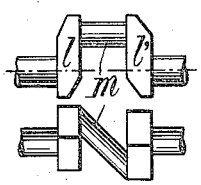
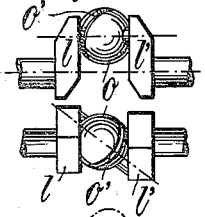
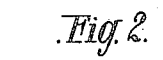
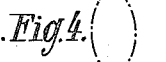
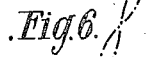
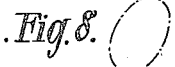
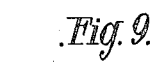
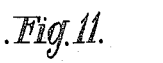
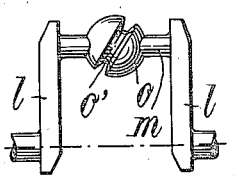
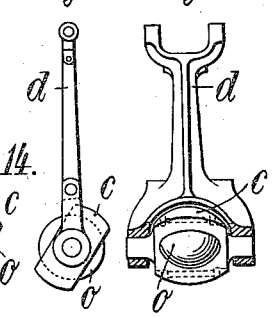
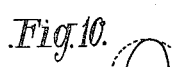
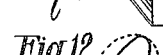
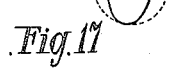
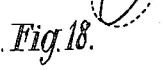
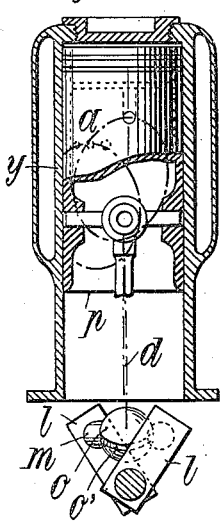
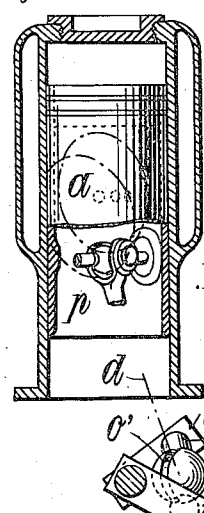
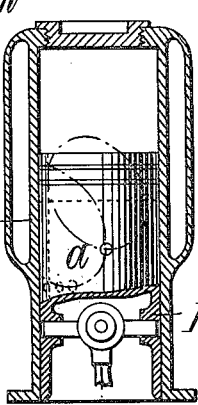
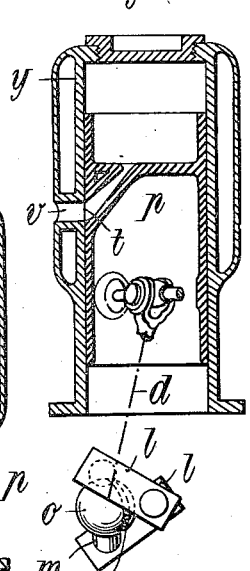
Attest
C. E. Parsons
H. L. Alden
Inventor
Andre Lafitte
by Spear Middleton
Donaldson & Spear
Attys A. LAFITTE.
DISTRIBUTION GEAR, SUCH AS VALVE MECHANISM.
APPLICATION FILED MAY 17, 1912.
1,138,960.
Patented May 11, 1915.
2 SHEETS—SHEET 2.
Fig. 21.
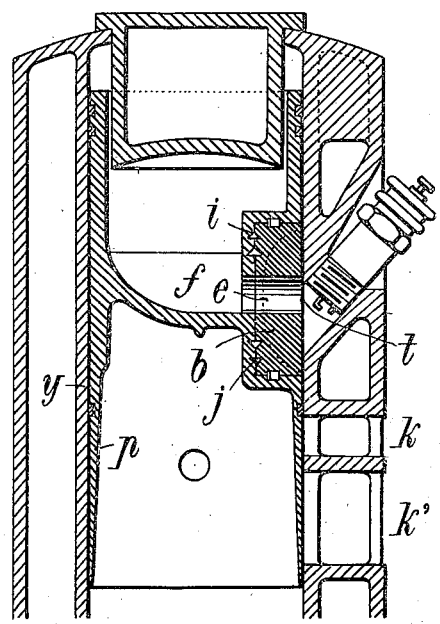
Fig. 22.
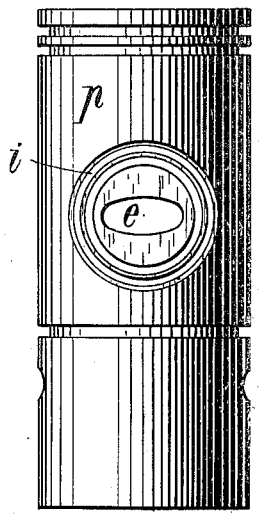
Fig. 25.     Fig. 24.     Fig. 23.
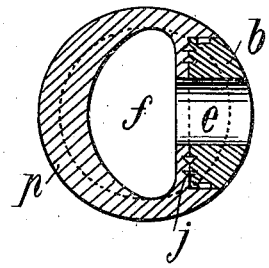  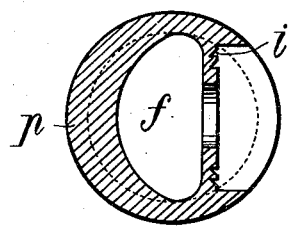
Fig. 26.
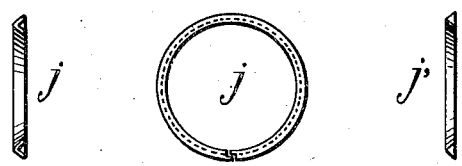
Attest
C. E. Parsons
H. L. Alden
Inventor
Andre Lafitte
By Spear, Middleton, Donaldson & Spear
Attys.

UNITED STATES PATENT OFFICE.

ANDRE LAFITTE, OF BIARRITZ, FRANCE.

DISTRIBUTION-GEAR, SUCH AS VALVE MECHANISM.

1,138,960. Specification of Letters Patent. Patented May 11, 1915.

Application filed May 17, 1912. Serial No. 698,002.

*To all whom it may concern:*

Be it known that I, ANDRE LAFITTE, a citizen of the French Republic, residing at Biarritz, France, have invented certain new and useful Improvements in Distribution-Gear, Such as Valve Mechanism, of which the following is a specification.

This invention relates to distribution, such as valve gear and comprises a spherical device which, when applied to engines, produces on normal crank pins the combined movement of ordinary reciprocation and of alternating rotation. It has been found that the driving effort is transmitted in the best possible manner with the normal crank pin, the axis of which is parallel to the main axis in the same plane. One of the chief reasons for this improved efficiency, is that the axis of the connecting rod always remains normal to the axis of the crank pin. The spherical device produces the combined movement with the crank pin with normal axis, or with eccentric crank pin with equal webs arranged at an angle to each other. Moreover, by applying the spherical device to inclined crank pins which, as is well known, already produce the combined movement, the effect of the spherical device forming the subject of this invention, will be added to that of the inclination of the axis, in order to enable the valve gear openings to be made of greater width by restricting their height. This makes it possible to lengthen the period of driving by delaying the moment of exhaust, as well as to increase in that way the suction period.

In the accompanying drawings, Figure 1 shows a normal crank pin in elevation and plan, Fig. 2 shows the resultant line produced by a point taken on a piston driven by a crank pin of that kind, Fig. 3 shows diagrammatically, in elevation and in plan, a normal crank pin with the spherical device, Fig. 4 shows the resultant line of a point taken on a piston driven by this kind of crank pin, Fig. 5 shows in elevation and in plan, a crank pin with two equal webs arranged at an angle to each other, Fig. 6 shows the resultant line of a point taken on a moving piston driven by a crank pin of this kind, Fig. 7 shows diagrammatically in elevation and in plan a crank pin with equal webs at an angle to each other, with the spherical device illustrated, Fig. 8 shows the resultant line of a point taken on a piston driven by a crank pin of this kind, Fig. 9 shows in elevation and in plan an inclined crank pin, its axis being in the same plane as the main axis, Fig. 10 shows in full lines the resultant line of a point on a piston driven by this inclined crank pin, and in dotted lines gives the diagram of the increased amplitude produced by the addition of the spherical device, Fig. 11 shows in elevation and in plan, a crank pin with oblique axis, in a plane different from that of the main axis, Fig. 12 shows in full lines the resultant line produced by the said oblique crank pin, and in dotted lines, the diagram of the increase of amplitude obtained by the addition of the spherical device, Fig. 13 shows, by way of example, the application to an engine assumed to be vertical, the spherical device being mounted on a normal crank pin, the movable outer parts of the hinge or joint being shown at the upper dead center, in the middle of the stroke, at the lower dead center and in the middle of the next stroke. Fig. 14 shows, by way of example, half a bearing of the connecting rod head, carrying a fixed half ring forming one piece with the same, Figs. 15 and 16 are side and front elevations of the connecting rod mounted on the bearing by means of a universal joint. Figs. 17–20 show in partial sections a body of an engine, the piston of which is driven by an eccentric crank pin supported by equal webs at an angle to each other, and provided with the spherical device. The connecting rod and its spherical bearing are not shown, so as to enable the position of the guide on the spherical crank pin to be considered in the chief positions of rotation of the crank, dead centers and mid-way positions. The last of these figures, namely Fig. 20, shows in section a cupped piston the bottom of which forms a partition through which passes a straight or oblique conduit in order to establish communication between the explosion chamber and the feed or exhaust openings of the cylinder. Fig. 21 shows in vertical section an engine, the distributing piston of which is combined with a spherical crank pin, so as to receive the following combined movements: reciprocating rectilinear motion and alternate rotating motion. This piston is provided with an obturator, level with the orifice of the conduit with which it is provided. Fig. 22 shows in side elevation the piston shown in Fig. 21. Figs. 23–25 are horizontal sections showing the piston, its obturator and the whole of the piston and of the obturator arranged in the latter. Fig. 26 shows in plan and in section one of the rings insuring a tight joint between the obturator with which the piston is provided, and the wall of the cylinder.

Having stated that it must be advantageous, both for removing resistances and for facilitating construction, to obtain combined movements with the crank pin with normal axis (Fig. 1), or on the crank pin with equal webs $l$ $l'$ at an angle to each other (Fig. 5), the said results are produced by the spherical device $o$ replacing the ordinary cylindrical device as crank pin. On the spherical device $o$ (Fig. 13) shown diagrammatically, is arranged, on a large circle of the sphere $o$, a guide $o'$ which can be fixed or movable, projecting or recessed, of any desired cross-section, continuous or uninterrupted, the said guide $o'$ having its axis of revolution inclined to a desired angle in the plane of the axes or outside the plane in question. In the example shown in Fig. 13, the spherical crank pin $o$ is provided with an inclined circular recess $o'$ corresponding to a circular projection $o$ provided on the spherical bearing $c$ (Fig. 14) which forms part of the Cardan joint parts of the head of the connecting rod $d$. It will be seen in Fig. 13 that during the rotation of the crank, the shifting of the plane of the guide $o'$ will produce alternating partial rotation of the connecting rod $d$ on its axis, and consequently that of the piston $p$ itself, even though the axis of the spherical crank pin $o$ be parallel to the main axis $z$ and in the same plane.

In examining successively Figs. 17, 18, 19, 20, it will be seen that the groove $o'$ shown by way of example, changes its direction at every moment of the rotation, and gives to a suitably pivoted piston $p$ the alternating movement of partial rotation. On the other hand, it must be remembered that the additional rotary movement which is not obtainable either with the simple normal crank pin (Fig. 1) or with the crank pin having equal webs at an angle to each other (Fig. 5), but is obtained on these two kinds of crank pins (Figs. 3 and 7) by means of the spherical device $o$, can give a pronounced additional advantage if it is applied to the various inclined crank pins (Figs. 9 and 11) which already produce such movement. In that case, an additional amplitude of rotation of the piston will be obtained, because the angular value of the rotation imparted by the spherical crank pin, is added to that of the inclination of the axis of the inclined crank pin.

In Fig. 10 the inner full line indicates the resultant of the point taken on a moving piston driven by an inclined cylindrical crank pin $u$, its axis being in the same plane as the main axis. The dotted outer line indicates the increased amplitude given to the resultant when the spherical device is adopted. The same (Fig. 11) applies when the inclined cylindrical crank pin $w$ has its axis in a plane different from that of the axis of the main shaft.

In Fig. 12, the full line is the result of the oblique crank pin $w$, and the dotted line is obtained by the use of the spherical crank pin $o$ in the same conditions as regards the axis. The practical result obtained by this spherical device, is to enable the distributing orifices $t$ in the wall of the piston $p$ to be made larger in the direction of width. The same applies to the inlet openings $a$ and exhaust openings $v$ in the cylinder wall. It will be readily understood that this extension enables the active gases to be kept for a longer time in the cylinder $y$, the efficiency thus being improved. Moreover, the gases escaping more quickly from the engine, allow the fresh gases to enter in better condition, and within a period of time which may be increased. It is indispensable, on the other hand, that at the moment of the production of the driving effort, as well as during the compression period, the gases should be retained, in the case of an explosion engine. If they are not held in the cylinder, they can leak through its orifices under the action of the pressure exercised by them on the side of the cylinder. For the purpose of avoiding the disadvantages in question, the piston $p$ (Figs. 21-25) is provided with a detachable obturating portion $b$ which has the form of a disk with cylindrical outer face. An opening $e$ is provided in the part $b$ and is connected to the conduit $f$ provided in the said piston $p$. The detachable portion is disposed in a lateral recess in the wall of the piston $p$, so that its outer cylindrical face can slide on the inner wall of the cylinder $y$. The bottom of the recess, which is flat, coöperates with the corresponding face of the obturator $b$, and these faces are provided respectively with one or more concentric grooves $i$ $i'$ of suitable cross-section with which one or more rings $j$ $j'$ working with double action are adapted to engage, the cross-section of the rings being triangular wedge shaped.

With reference to Fig. 26, it will be seen that the rings $j$ $j'$ arranged in the grooves $i, i'$ between the piston $p$ and the obturator $b$, have the tendency, by their own elastic reaction, to increase the diameter of the piston $p$ by moving the obturator away from the piston, which action forces the obturator tightly against the wall of the cylinder $y$. On the other hand, the compressed liquid or gases under pressure that may escape between the faces of the piston $p$ and of the obturator $b$, will act on the inner part of each ring $j\ j'$ and have the tendency to open them out. As the cross-section of the said rings is wedge-shaped, it will follow that, by moving between the combined faces in the grooves $i\ i'$, they will again have the tendency to push the obturator $b$ away from the piston $p$, and will force the obturator against the surface of the cylinder $y$, so as to produce a tight joint. Owing to this arrangement, any leakages, loss of fluid or fall of pressure, are avoided, as the rings $j\ j'$ prevent the fluid from passing between the piston $p$ and the obturator $b$, and because their own reaction, to which is added that of the fluid, acts so as to insure a tight joint between the obturator and the cylinder $y$. In the case of an explosion engine, the application of the above-described means makes it possible to effect ignition through the orifice of the piston $p$ corresponding to the orifice $t$ of the obturator $b$. The ignition device is then arranged near that point of the cylinder, in front of which the conduit $f$ passes at the moment when the explosion takes place. In the case illustrated, that is of a two-stroke engine, $k$ indicates the orifice for the admission of the explosion mixture, and $k'$ the orifice for expelling the exhaust gases.

What I claim as my invention and desire to secure by Letters Patent:—

1. In an internal combustion engine, a piston, valve gear in which the piston acts as a valve, a cylindrical recess, arranged concentrically with the piston port, a cylindrical disk in said recess having an opening for the purpose of extending the said port, packing rings between the disk and the wall of the recess, and means for pressing the said disk against the inner wall of the cylinder and for bringing the piston port in register with the cylinder port.

2. In an internal combustion engine, a piston, valve gear in which the piston acts as a valve, a cylindrical recess, arranged concentrically with the piston port, a cylindrical disk in said recess having an opening for the purpose of extending the said port, packing rings between the disk and the wall of the recess in the piston, circular grooves triangular in cross-section at the bottom of the said recess, similar grooves on the flat face of the cylindrical disk, triangular packing rings engaging the said grooves for the purpose of pressing the disk against the wall of the cylinder and means for bringing the cylinder port in register with the piston port.

3. In an internal combustion engine, a piston, valve gear in which the piston acts as a valve, a cylindrical recess, arranged concentrically with the piston port, a cylindrical disk in said recess having an opening for the purpose of extending the said port, packing rings between the disk and the wall of the recess in the piston, circular grooves triangular in cross-section at the bottom of the said recess, similar grooves on the flat face of the cylindrical disk, triangular packing rings engaging the said grooves for the purpose of pressing the disk against the wall of the cylinder, a connecting rod between the piston and the controlling crank, a forked big end on the connecting rod having openings in its branches, pins engaging the said openings, the said pins being oppositely arranged to a spherical bearing, a ball for the said bearing, the said ball being arranged on an inclined crank pin with which the crank shaft is provided, and means for bringing the cylinder port in register with the piston port.

4. In an internal combustion engine, a piston, valve gear in which the piston acts as a valve, a cylindrical recess, arranged concentrically with the piston port, a cylindrical disk in said recess having an opening for the purpose of extending the said port, packing rings between the disk and the wall of the recess in the piston, circular grooves triangular in cross-section at the bottom of the said recess, similar grooves on the flat face of the cylindrical disk, triangular packing rings engaging the said grooves for the purpose of pressing the disk against the wall of the cylinder, a connecting rod between the piston and the controlling crank, a forked big end on the connecting rod having openings in its branches, pins engaging the said openings, the said pins being oppositely arranged to two hemispherical parts secured to one another to form a spherical bearing, a tongue projecting inside the said bearing, a groove for receiving the said tongue arranged at an angle on a ball secured to the inclined crank pin of the crank shaft.

5. In an internal combustion engine, a cylinder provided with admission and exhaust ports, a piston having ports leading to the cylinder working space, a connecting rod for said piston, a forked big end on the connecting rod, a spherical bearing, gudgeon pins diametrically arranged on the spherical bearing and journaled in the fork arms, a crank-shaft having an inclined crank pin, a ball on the crank-pin corresponding to the spherical bearing, and a tongue on the bearing engaging with a circumferential groove on the ball, for the purpose set forth.

6. In an internal combustion engine, a cylinder provided with admission and exhaust ports, a piston having ports leading to the cylinder working space, a connecting rod for said piston, a forked big end on the connecting rod, a spherical bearing, gudgeon pins diametrically arranged on the spherical bearing and journaled in the fork arms, a crank shaft having an inclined crank pin, a ball on the crank pin corresponding to the spherical bearing, a tongue on the bearing engaging with a circumferential groove on the ball, for the purpose set forth and means for making the piston air-tight.

In testimony whereof I have signed my name to this specification in the presence of two subscribing witnesses.

ANDRE LAFITTE.

Witnesses:
ARTHUR SAMSTTER,
BENJAMIN MATTHEW.